O. T. SWEET.
OUTLET BOX AND SUPPORT THEREFOR.
APPLICATION FILED MAY 25, 1914.
1,225,525.
Patented May 8, 1917.
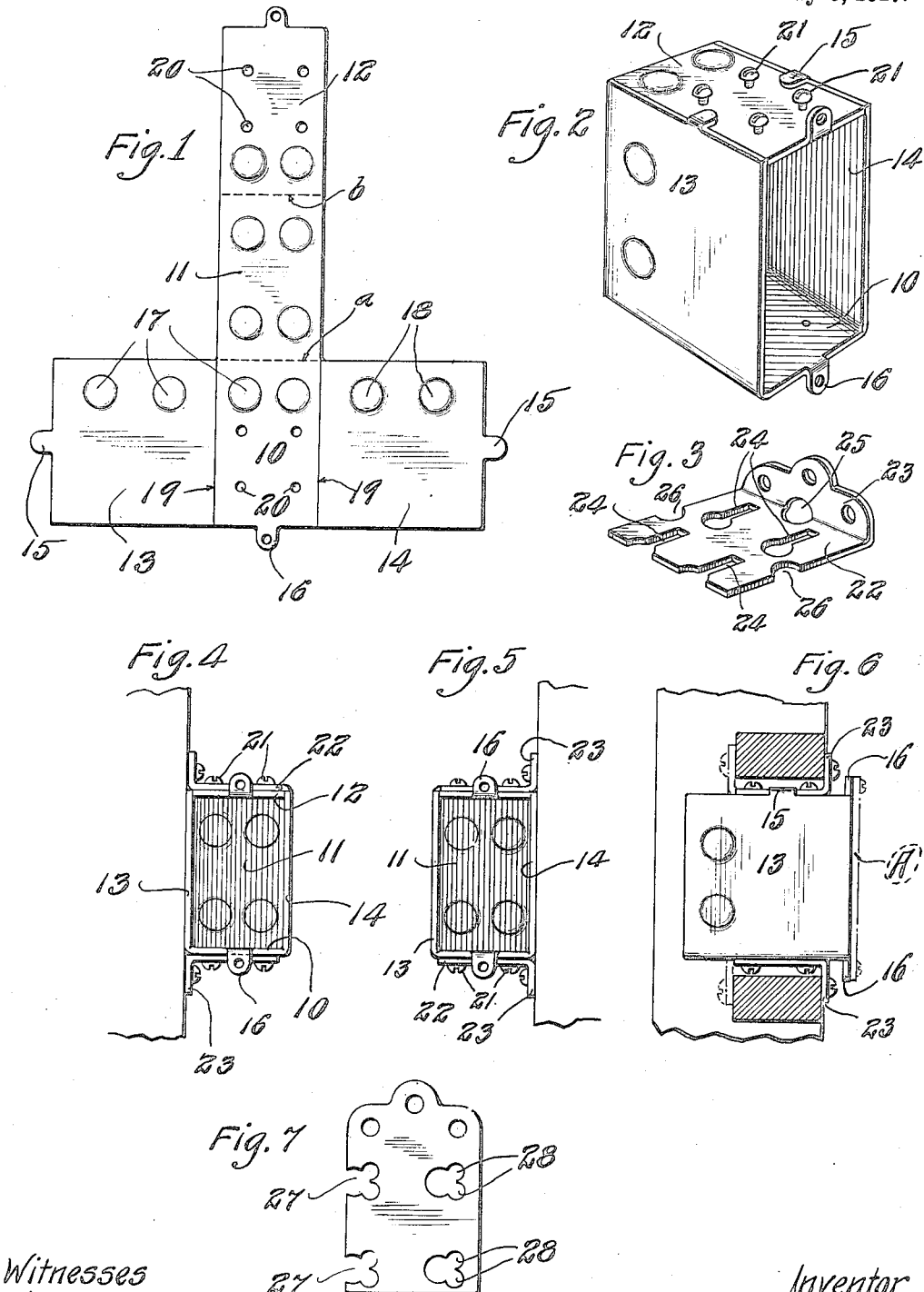
Witnesses
Wm. Janus
M. C. Smith
Inventor
Oliver T. Sweet
By ____ Atty.

UNITED STATES PATENT OFFICE.

OLIVER T. SWEET, OF ST. LOUIS, MISSOURI.

OUTLET-BOX AND SUPPORT THEREFOR.

1,225,525.    Specification of Letters Patent.    Patented May 8, 1917.

Application filed May 25, 1914. Serial No. 840,821.

*To all whom it may concern:*

Be it known that I, OLIVER T. SWEET, a citizen of the United States, residing at the city of St. Louis, State of Missouri, have invented a certain new and useful Improvement in Outlet-Boxes and Supports Therefor, of which the following is a full, clear, and exact description, such as will enable others skilled in the art to which it appertains to make and use the same, reference being had to the accompanying drawings, forming part of this specification, in which—

Figure 1 is a plan view of the sheet metal blank from which my improved outlet box is formed.

Fig. 2 is a perspective view of an outlet box as contemplated by my invention.

Fig. 3 is a perspective view of one of the supporting members utilized in connection with my improved box.

Figs. 4 and 5 are front elevational views of boxes which are attached by means of my improved supports to vertical wall members such as studding.

Fig. 6 is a side elevational view of one of the boxes supported by the attaching means upon a pair of transversely disposed wall members.

Fig. 7 is a plan view of the blank from which a modified form of the support is constructed.

My invention relates to receptacles known as outlet boxes and which are generally placed in the walls of buildings to receive the ends of conduits carrying electric wires, which latter form a part of the electric lighting system of the building, and being connected to switches, fuses or the like located within the outlet boxes.

The principal object of my invention is to generally improve upon the construction of the types of outlet boxes now in general use; to form the main body of the box from a single piece of sheet metal, and to provide a simple and inexpensive universal support or bracket which can be interchangeably and adjustably combined with the box so as to rigidly support the same on either side of a vertical wall member or upon the upper or lower side of a horizontally disposed wall member.

With the foregoing and other objects in view, my invention consists in certain novel features of construction and arrangement of parts, hereinafter more fully described and claimed.

In Fig. 1 I have shown the blank form from which the body of the box is constructed, said blank being stamped or cut from sheet metal and comprising a rectangular section 10 which forms the bottom of the box, a rectangular section 11 which forms the back, a rectangular section 12 which forms the top, and a pair of rectangular sections 13 and 14 which are located to the sides of the section 10 and which sections 13 and 14 form the sides of the box.

Formed integral with the outer edges of the sections 13 and 14 are projections 15 which, when the box is bent into proper shape for use as shown in Fig. 2, are bent downward over the side edges of the top section 12, thereby holding said top section firmly between the upper portions of the sides 13 and 14.

Formed integral with the outer edges of the sections 10 and 12 are perforated ears 16 which, when the box is bent into shape for use, are bent at right angles to said sections 10 and 12, thereby forming supports for the screws utilized in attaching the front cover plate A of the box. (See Fig. 6.)

Formed at suitable points in the top and bottom and walls of the box are apertures 17 through which the ends of the conduits are brought into the box, and these apertures are normally closed by readily removable disks or plugs 18. The lines between the bottom section 10 and side sections 13 and 14 are scored or indented as designated by 19 in order to permit the side sections to be readily bent upward with respect to the bottom section during the formation of the box, and also to permit either one of the side sections to be readily detached from the base section.

Where it is desired to assemble two or more of the boxes in juxtaposition it will be necessary to remove one or both side walls from a box, and this can be readily accomplished by bending either one of the side sections backward and forward along the scored or indented lines 19, thus fracturing the metal on said lines and permitting the ready removal of either one or both of said side sections.

When a blank section such as is shown in Fig. 1 is bent to form a box or receptacle as shown in Fig. 2, the blank section 11 is bent into the dotted line $a$ upward at right angles to the plane occupied by the bottom section 10 after which the top section 12 is bent along the dotted line $b$ so that it occupies a position parallel with the bottom section 10 and at right angles to the back section 11.

The side sections 13 and 14 are now bent along the scored lines 19 so as to occupy planes parallel to each other and at right angles to the plane occupied by the bottom section 10. Thus the edges of said side sections which are provided with the ears 15 coincide with the side edges of the top section 12 and the ears 15 are now bent downward onto said top section, thereby practically locking the side sections to said top section.

Formed in the top and bottom sections 12 and 10 are threaded apertures 20, the same being located at equal distances apart, and in square arrangement, and which apertures receive the threaded shanks of screws 21, which latter serve as anchors or points of attachment for the supports or brackets associated with the box.

As hereinbefore stated, these screw holes are arranged at equal distances apart and in square arrangement, in order that the supporting brackets can be applied to the screws occupying said apertures from either side, or from the front or rear of the box, thus making it possible to readily support said box to either side of a studding or to the front or rear of a transverse rail between a pair of studs.

The supporting plate or bracket which is associated with my improved box comprises a flat plate 22, preferably of metal, one end of which is bent at right angles to the main body of the plate to form an attaching lip or flange 23, the same being perforated in order to receive screws or like fastening devices.

Formed in this plate are two pairs of key hole openings 24, the larger portions of which are arranged so as to receive the screws 21 of either the top or bottom plate of the box.

After the plate has been placed on the box with the heads of the screws projecting through the large portions of the key hole openings, the plate is shifted so that the heads of said screws are positioned above the slotted portions of said key hole openings after which the screws are tightened to lock the plate to the box.

The slotted portions of the key hole openings 24 are of sufficient length to permit the plate to be adjusted backward or forward or to either side when applied to the box.

Formed in the forward end of the attaching plate 22 and in the lower portion of the lip or flange 23 is an aperture 25 which accommodates either one of the ears 15 when the attaching plate is applied to the box from either side as shown in Figs. 4 and 5, and formed in the side edges of said plate are notches 26 which accommodate the ears 15 when said attaching plate is applied to the box with the lip or flange 23 to the front or rear as shown in Fig. 6.

In the form of attaching plate shown in Fig. 7 four large apertures 27 of sufficient size to accommodate the heads of the screws 21 are formed in the plate in square arrangement and formed to one side of these apertures and communicating therewith and with each other are small apertures or notches 28 which receive the shanks of the screws 21 when said plate is applied to the box.

To install a box of my improved construction plates 22 are applied to the top and bottom sections of said box and as heretofore described, the attaching plates can be readily arranged with the flanges or lips 23 to either side or toward the front or rear of the box as may be required to properly locate the box in the wall, and after the screws 21 have been tightened to lock the attaching plates or brackets, screws or like fastening devices are inserted through the apertures in the lips or flanges 23, and said last mentioned screws are seated in the studding or cross pieces of the wall structure.

One or more conduits carrying electric wires may be brought into the box by removing the plugs or plates 18 which normally close the openings 17.

An outlet box of my improved construction is comparatively simple and can be easily and cheaply manufactured for the reason that it can be readily stamped from a single piece of sheet metal.

Inasmuch as my improved form of attaching plate or bracket can be interchangeably and adjustably applied to the box, said plate or bracket forms a universal support or attaching member for the reason that it can be readily adjusted to suit different conditions and the different positions of the wall members to which the boxes are usually applied.

It will be readily understood that minor changes in the size, form and construction of the various parts of my improved outlet box can be made and substituted for those herein shown and described, without departing from the spirit of my invention, the scope of which is set forth in the appended claims.

I claim:

1. The combination with an outlet box having a plurality of studs projecting from the side thereof, which studs are disposed in square arrangement, of an attaching member having an angular flange at one extremity thereof, said attaching member being provided with apertures adapted to accommodate the plurality of studs whereby the attaching plate may be selectively secured to the box with the angular flange at either the front or rear or at either side thereof.

2. The combination with an outlet box having a plurality of headed studs projecting from one side thereof, which studs are disposed in square arrangement, of an attaching plate having an angular flange at one extremity thereof, said attaching plate being provided with key hole apertures disposed in square arrangement and adapted to accommodate the headed studs whereby the attaching plate may be selectively secured to the box with the angular flange disposed toward the front or rear of the box or toward either side thereof.

3. The combination with an outlet box having a plurality of studs projecting from one side thereof, of an attaching member comprising a plate and a flange projecting at right angles from one end thereof, said plate being provided with apertures adapted to accommodate said studs, said studs and apertures being relatively located so as to permit the attaching member to be selectively secured to the box with the flange disposed toward the front or rear of the box or toward either side thereof.

In testimony whereof I hereunto affix my signature in the presence of two witnesses, this 22nd day of April, 1914.

OLIVER T. SWEET.

Witnesses:
M. P. SMITH,
M. A. HANDEL.